US008958536B2

(12) United States Patent
Charish et al.

(10) Patent No.: US 8,958,536 B2
(45) Date of Patent: Feb. 17, 2015

(54) METHOD AND SYSTEM FOR PROVIDING AN AUDIO/VIDEO CONFERENCE

(71) Applicants: Avrohom Y. Charish, New York, NY (US); Alan Levy, New York, NY (US); Aleksandr Yampolskiy, New York, NY (US)

(72) Inventors: Avrohom Y. Charish, New York, NY (US); Alan Levy, New York, NY (US); Aleksandr Yampolskiy, New York, NY (US)

(73) Assignee: Cinchcast, Inc., New York, NY (US)

( * ) Notice: Subject to any disclaimer, the term of this patent is extended or adjusted under 35 U.S.C. 154(b) by 206 days.

(21) Appl. No.: 13/647,261

(22) Filed: Oct. 8, 2012

(65) Prior Publication Data

US 2013/0027508 A1    Jan. 31, 2013

Related U.S. Application Data

(63) Continuation-in-part of application No. 11/784,082, filed on Apr. 5, 2007, now Pat. No. 8,098,807.

(51) Int. Cl.
| | |
|---|---|
| *H04M 3/42* | (2006.01) |
| *H04L 12/16* | (2006.01) |
| *H04Q 11/00* | (2006.01) |
| *H04M 3/56* | (2006.01) |
| *H04M 7/12* | (2006.01) |
| *H04N 7/15* | (2006.01) |
| *H04L 12/18* | (2006.01) |

(52) U.S. Cl.
CPC ............ *H04M 3/56* (2013.01); *H04M 7/123* (2013.01); *H04N 7/15* (2013.01); *H04L 12/1822* (2013.01); *H04L 12/1827* (2013.01); *H04M 2203/5063* (2013.01)
USPC ............ 379/202.01; 379/203.01; 379/204.01; 379/205.01; 370/260; 370/261; 370/262

(58) Field of Classification Search
USPC ............. 379/202.01, 230.01, 204.01, 205.01; 709/204; 370/260, 352, 261, 262; 455/556
See application file for complete search history.

(56) References Cited

U.S. PATENT DOCUMENTS

| | | | |
|---|---|---|---|
| 6,167,432 A | 12/2000 | Jiang | |
| 6,195,357 B1 | 2/2001 | Polcyn | |
| 6,272,214 B1 | 8/2001 | Jonsson | |
| 6,314,094 B1 | 11/2001 | Boys | |

(Continued)

OTHER PUBLICATIONS

"U.S. Appl. No. 11/794,082, Final Office Action mailed May 10, 2011", 11 pgs.

(Continued)

*Primary Examiner* — Thjuan K Addy
(74) *Attorney, Agent, or Firm* — Dentons US LLP

(57) ABSTRACT

A method and system for providing an audio/video conference includes receiving audio from a moderator via a circuit-switched telephone network, transmitting a representation of the audio to a first listener group via the circuit-switched telephone network, and transmitting a representation of the audio to a second listener group via a packet-switched network. The audio/video conference may be transmitted to the first listener group and the second listener group in real-time or near real-time (e.g., within a few seconds). The method and system may be used with a circuit-switched telephone network such as, for example, a public switched telephone network. Further, the method and system may be used with a packet-switched network such as, for example, the Internet. The method and system further provide synchronization of video data, including slide data, and audio data related to the audio/video conference.

29 Claims, 13 Drawing Sheets

(56) References Cited

U.S. PATENT DOCUMENTS

| | | |
|---|---|---|
| 6,418,214 B1 | 7/2002 | Smythe et al. |
| 6,487,585 B1 | 11/2002 | Yurkovic |
| 6,577,716 B1 | 6/2003 | Minter et al. |
| 6,594,269 B1 | 7/2003 | Polcyn |
| 6,609,096 B1 | 8/2003 | De Bonet et al. |
| 6,658,325 B2 | 12/2003 | Zweig |
| 6,678,737 B1 | 1/2004 | Bucher |
| 6,760,750 B1 | 7/2004 | Boneh et al. |
| 6,904,264 B1 | 6/2005 | Frantz |
| 6,985,694 B1 | 1/2006 | De Bonet et al. |
| 6,990,312 B1 | 1/2006 | Gioscia et al. |
| 6,993,004 B2 | 1/2006 | Boys |
| 7,017,120 B2 | 3/2006 | Shnier |
| 7,058,694 B1 | 6/2006 | De Bonet et al. |
| 7,076,202 B1 | 7/2006 | Billmaier |
| 7,171,174 B2 | 1/2007 | Ellis et al. |
| 7,565,115 B2 * | 7/2009 | Alexis ............... 455/74.1 |
| 7,664,103 B2 | 2/2010 | Chu et al. |
| 8,098,807 B2 | 1/2012 | Charish |
| 8,515,044 B2 | 8/2013 | Charish |
| 2002/0049852 A1 | 4/2002 | Lee et al. |
| 2002/0082046 A1 | 6/2002 | Peters, III |
| 2002/0091769 A1 | 7/2002 | Drozdzewicz et al. |
| 2002/0136382 A1 | 9/2002 | Cohen et al. |
| 2004/0039794 A1 | 2/2004 | Biby et al. |
| 2004/0062210 A1 | 4/2004 | Genter et al. |
| 2004/0193683 A1 | 9/2004 | Blumofe |
| 2012/0147787 A1 | 6/2012 | Charish |

OTHER PUBLICATIONS

"U.S. Appl. No. 11/794,082, Non Final Office Action mailed Nov. 23, 2010", 39 pgs.

"U.S. Appl. No. 11/794,082, Notice of Allowance mailed Oct. 12, 2011", 5 pgs.

"U.S. Appl. No. 11/794,082, Response filed Feb. 23, 2011 to Non Final Office Action mailed Nov. 23, 2010", 15 pgs.

"U.S. Appl. No. 11/794,082, Response filed Aug. 2, 2011 to Final Office Action mailed May 10, 2011", 13 pgs.

"U.S. Appl. No. 13/325,022, Final Office Action mailed Feb. 20, 2013", 12 pgs.

"U.S. Appl. No. 13/325,022, Non Final Office Action mailed Aug. 31, 2012", 12 pgs.

"U.S. Appl. No. 13/325,022, Notice of Allowance mailed Apr. 17, 2013", 6 pgs.

"U.S. Appl. No. 13/325,022, Response filed Mar. 26, 2013 to Final Office Action mailed Feb. 20, 2013", 7 pgs.

"U.S. Appl. No. 13/325,022, Response filed Dec. 31, 2012 to Office Action mailed Aug. 31, 2012", 8 pgs.

"Talkshoe.com Articles", http://web.archive.org/web/*http:talkshoe.com, Apr. 12, 2006-Mar. 25, 2007.

* cited by examiner

METHOD AND SYSTEM FOR PROVIDING AN AUDIO/VIDEO CONFERENCE

CROSS-REFERENCE TO RELATED APPLICATIONS

This continuation-in-part application claims priority to U.S. patent application Ser. No. 11/784,082, filed Apr. 5, 2007, which is hereby incorporated by reference in its entirety.

BACKGROUND

A. Technical Field

Embodiments generally relate to the audio/video conference field, and more specifically to an improved method and system for providing an audio/video conference in real-time or near real-time with streaming audio and video, such as slide presentations.

B. Background

There are several methods and systems that facilitate an audio/video conference between a moderator, one or more guests and several listeners. At the very basic level, a radio talk show uses the radio spectrum to transmit audio from the moderator, and uses the telephone network to receive audio from a listener. In the digital realm, services such as SKYPE-CAST use the Internet to transmit audio from the moderator and to receive audio from a listener. The radio talk show requires the listener to have both a radio and a telephone, while the SKYPECAST service requires the listener to have a computer, a downloaded and installed client on their computer, and a microphone.

Thus, there is a need in the field of audio/video conferences for an audio/video conference system and method that simplifies the requirements of the user and/or broadens the available audience. Example embodiments provide such a method and system.

SUMMARY

An embodiment relates to a method of providing an audio/video conference in near real time. Embodiments include audio/visual conferences over PSTN or voice over IP (VOIP), or any other communication medium as is known in the art. In the method, audio is received from a moderator via a network. Then, a representation of the audio is transmitted to one or more first listener(s) via a public switched telephone network, and a representation of the audio is transmitted to one or more second listener(s) via the Internet.

In one version, the method further comprises providing the moderator with a telephone number that corresponds to a moderator position within the audio/video conference. The telephone number can be posted on a web page or provided in an advertisement typically distributed to the public.

In another version, the method further comprises maintaining the conference upon disconnection of the moderator from the conference to permit the moderator to re-connect into the conference. Assuming that the moderator calls back into the conference, the moderator is reconnected.

The first listener can be provided with a telephone number that corresponds to a listener position within the audio/video conference, and the second listener can be provided with a URL that corresponds (a URL doesn't correspond to listener position) to a listener position within the audio/video conference. In at least this example embodiment, an encoded and streaming representation of the audio is transmitted to the second listener via the Internet.

In an example embodiment, information related to the audio/video conference can be displayed to the moderator via the Internet. FIG. 15 illustrates such an exemplary embodiment. The information can include the caller identification of the first listener, or the number of listeners that receive the representation of the audio via the PSTN, or the number of listeners that receive the representation of the audio via the PSTN or VoIP via the Internet. The information can be displayed to the moderator using the Internet and an Internet browser.

In one embodiment, the method further includes embedding transition indications in the audio associated with the conference call. The method further comprises streaming data comprising slides of video data, a slide of the video data being displayed or transitioned at a time based on an embedded transition indication. Transition indications may be embedded in meta data tags associated with segments of the audio. For example, the meta data tags may be MP3 ID3 tags. Embedding transition indications in the meta data can allow for synchronizing the video data with the MP3 audio data. For example, slide transitions can occur upon receipt of an embedded transition indication.

Other embodiments include providing visual information, such as a slide presentation, to a listener before a talk show or audio/visual conference. Then, in response to receiving transition indications in the audio stream, the visual information can change by, for example, transitioning to the next slide in a presentation.

In yet another example embodiment, a signal indicating a desire to contribute audio to the audio/video conference from the first listener can be accepted. For example, the signal can include one or more dialed tones on the PSTN. Once the signal is accepted, the first listener is joined into the audio/video conference and audio is received from the first listener via the public switched network, for example, and a representation of the audio from the first listener is transmitted to the second listener. Additional embodiments can include similar implementations using voice-over IP (VOIP).

In an example embodiment, an input from the moderator via the Internet to play an audio file can be accepted, and a representation of the audio file is transmitted to the first and second listeners.

In each of the embodiments described above, a representation of the audio/visual conference (including audio file(s) played and transition indications) can be recorded for purposes of archival or later playing, or streamed in real-time to virtually any listener wishing to listen to and view the audio/visual conference. Playback of archived audio/video conferences can include, as described in more detail throughout this specification, synchronization of the audio and visual streams.

Example embodiments provide a computer program product that, when executed by a machine, provides an audio/video conference in real time. The computer program product includes instructions to receive audio from a moderator via a public switched telephone network or VOIP, instructions to transmit a representation of the audio to a first listener via the PSTN; and instructions to transmit a representation of the audio to a second listener via the Internet.

Example embodiments provide a method for administrating network-based audio conferencing. The method includes the steps of enabling a two-way audio/video conference between a moderator and a guest, encoding, in real-time, audio data indicative of the two-way audio/video conference in a streaming format along with transition indications; and publishing a representation of the audio data in the streaming format with transition indications in real-time. The step of publishing is can be implemented by storing the audio data in the streaming format on computer readable medium accessible by a streaming server having a URL; and providing a hyperlink to the URL of the streaming server on a web page to publish the stored audio data.

Example embodiments relate to an audio server system for establishing two-way audio communication between a moderator terminal and one or more guest terminals. The audio server system comprises a conferencing system and a media encoder. The conferencing system enables two-way audio communication between the moderator terminal and the guest terminal. The media encoder receives audio data representative of the two-way audio/visual communication, and encodes the audio data representative of the two-way audio communication in a streaming format with transition indications. The audio server system also includes means for publishing, while the two-way audio communication between the moderator terminal and the guest terminal is ongoing, the two-way audio communication in a streaming format.

Example embodiments relate to an audio server system for establishing two-way audio communication between a moderator terminal and a guest terminal, the audio server system being accessible by a listener terminal via the Internet. The audio server system includes a conferencing system, a media encoder, a time synchronization server, a streaming server, and a web server. The conferencing system enables two-way audio communication between the moderator terminal and the guest terminal. The media encoder receives audio data representative of the two-way audio communication in real-time, and encodes the audio data representative of the two-way audio communication in a streaming format. The media encoder stores the two-way audio communication in the streaming format on one or more computer readable medium. The streaming server has a URL and also has access to the two-way audio communication in the streaming format. The web server provides a web page having a hyperlink including the URL of the streaming server whereby upon activation of the hyperlink by the listener terminal, the listener terminal is directed to the URL of the streaming server to stream the two-way audio communication to the listener terminal.

Example embodiments relate to a time synchronization mechanism for synchronizing video data associated with the audio data.

BRIEF DESCRIPTION OF THE SEVERAL VIEWS OF THE DRAWING

So that the above recited features and advantages of example embodiments can be understood in detail, a more particular description of embodiments, briefly summarized above, may be had by reference to the embodiments thereof that are illustrated in the appended drawings. It is to be noted, however, that the appended drawings illustrate only exemplary embodiments and are therefore not to be considered limiting of its scope, for the invention may admit to other equally effective embodiments.

DESCRIPTION

Figure 1:
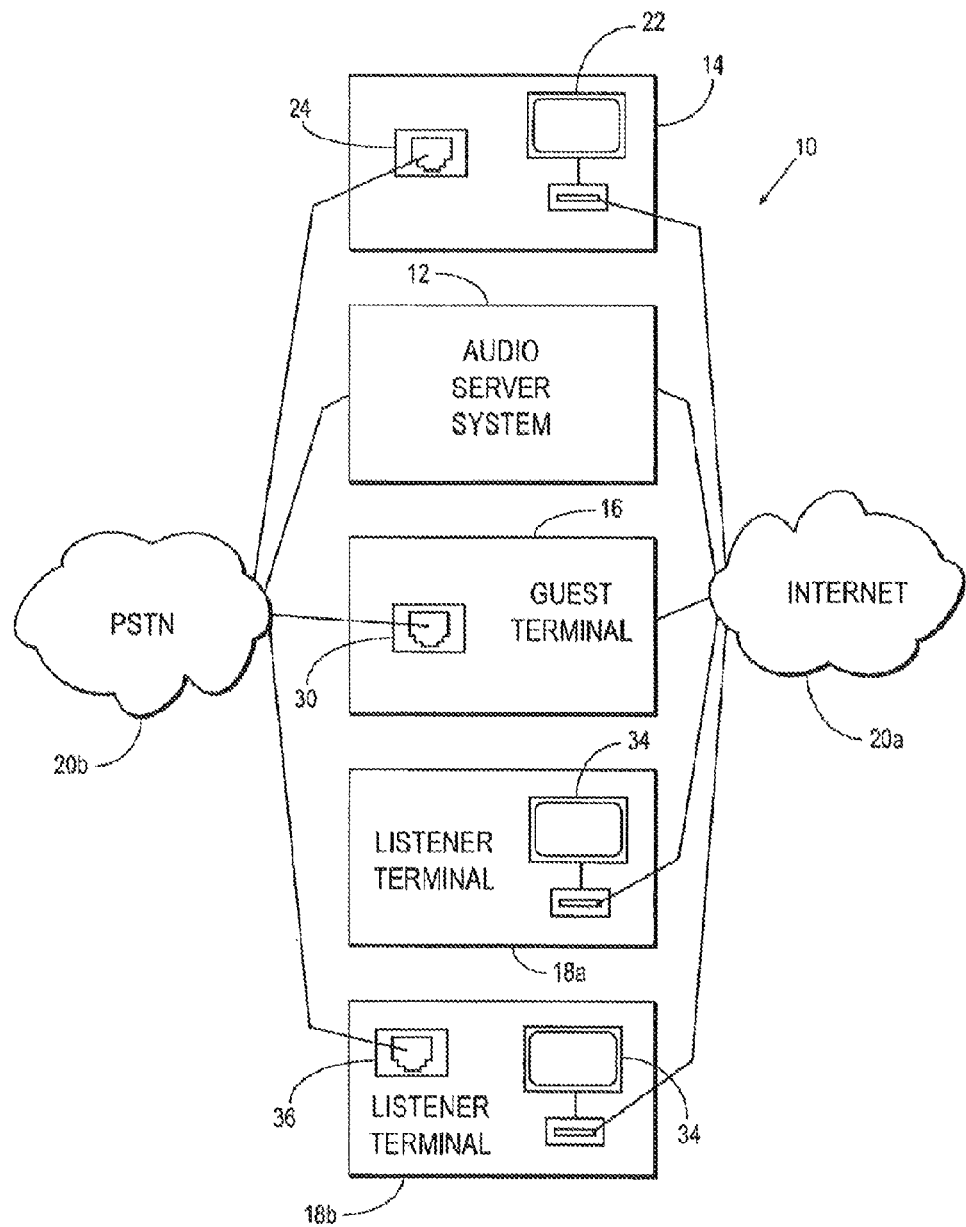
FIG. 1 illustrates a schematic representation of an audio/video conference system constructed in accordance with example embodiments.

The following description of the exemplary embodiments of the invention is not intended to limit the invention to these exemplary embodiments, but rather to enable any person skilled in the art to make and use this invention. Presently, exemplary embodiments of the invention are shown in the above-identified figures and described in detail below. In describing the exemplary embodiments, like or identical reference numerals are used to identify common or similar elements. The figures are not necessarily to scale and certain features and certain views of the figures may be shown exaggerated in scale or in schematic in the interest of clarity and conciseness.

1. Hardware of the System

As shown in FIG. 1, example embodiments relate to a computer-based system and method which administrates network-based audio conferencing enabling users to schedule, moderate, and attend network-based conferences, without manual system administration. One example embodiment may be used to schedule and administer one or more simultaneous talk shows or audio/visual conferences. As will be described in more detail below, in an embodiment, the computer-based system is a platform that allows a person to moderate a live talk show or audio/visual conference online using only a telephone and a computer terminal having access to the Internet and a web browser.

Referring to FIG. 1, shown therein is a block diagram of an exemplary audio conferencing system 10 suitable for implementing embodiments. The audio conferencing system 10 includes one or more audio server systems 12; one or more moderator terminals 14; one or more guest terminals 16; one or more listener terminals 18a and 18b; and one or more networks 20a and 20b. Only one audio server system 12, one moderator terminal 14, one guest terminals 16, two listener terminals 18a and 18b; and two networks 20a and 20b are shown in FIG. 1 as an example.

The moderator terminal 14 includes a computer terminal 22 and a two-way audio communication device 24, such as a landline telephone, mobile telephone, VOIP, soft phone or the like, indirectly connected to the audio server system 12 via the networks 20a and 20b. Although the two-way audio communication device 24 is shown separately, the two-way audio communication device 24 can be implemented as a part of the computer terminal 22 so long as such computer terminal 22 is adapted for audio communication. For example, the computer terminal 22 can be provided with a suitable microphone and speaker system. In addition, the two-way audio communication device 24 can be adapted to communicate with the audio server system 12 using either the network 20a or 20b. As discussed below, the computer terminal 22 can be provided with a web browser to permit the moderator to access a variety of information provided by the audio server system 12 regarding the network-based audio/visual conferences. Such information may include call-in telephone numbers, scheduling information or the like and can be provided on a web-page.

The network 20a may be a packetized or packet-switched network such as the world's public IP-based packet-switched networks, also known as the Internet or some other network-type, such as a wide area network (WAN) or local area network (LAN). The network 20b may be a circuit-switched network such as a public switched network typically used to make telephone calls, i.e., the network of the world's public circuit-switched telephone networks, also known as the PSTN. However, it should be understood that the networks 20a or 20b may be provided as other types of networks, such as a cellular telephone network. For purposes of clarity, the network 20a will be referred to hereinafter as a "packetized" or "packet-switched" network, and the network 20b will be referred to hereinafter as a "switched network". In an exemplary embodiment, the two-way audio communication device 24 is a conventional telephone provided separately from the computer terminal 22 and communicates with the audio server system 12 via the switched network 20b.

The guest terminal 16 is also provided with a two-way audio communication device 30, which is shown by way of example as a telephone connected to the switched network 20b. However, it should be understood that the communication device 30 can be implemented in other manners, such as a computer terminal having suitable software and a microphone and speaker, or a landline telephone, mobile telephone, soft phone or voice over internet telephone. In addition, the guest terminal 16 may also be provided with a computer terminal (not shown) having access to the network 20a and also having a web browser to permit the guest to access a variety of information provided by the audio server system 12 regarding the network-based conferences. Such information may include call-in telephone numbers, scheduling information or the like and can be provided on a web-page.

The listener terminals 18 include a computer terminal 34 for accessing a variety of information provided by the audio server system 12, such as call-in telephone numbers, scheduling information, one-way audio streams of real-time or near real-time network-based audio/video conferences, or stored audio streams of past (not real-time) audio/video conferences. The listener terminals 18 may also include a separate one-way communication device 36 permitting the listener to listen to audio streams of real-time or near real-time network-based audio/video conferences. The one-way communication device 36 can be implemented, by way of example, as a two-way communication device, such as a landline telephone, mobile telephone, soft phone or voice over internet telephone, only allowing the listener to listen to the audio streams of real-time or near real-time or past network-based audio/video conferences.

The computer terminal 22 or 34 may be a computer having an Internet connection, for example through a direct Internet connection, a LAN, or through an Internet service provider. The computer terminals 22 or 34 may be a windows-based PC, a Macintosh, a cellular telephone or a personal data assistant for example. The computer terminals 22 or 34 can include speakers and web-browser software, such as Microsoft's "Internet Explorer" or Netscape's "Navigator", having audio/video player software such as Real Network's "Real Player" or Windows® Media Player for receiving media streams. The computer terminal 22 may also include a microphone and software for audio output/input to permit two-way audio communication with the audio server system 12.

Figure 2:
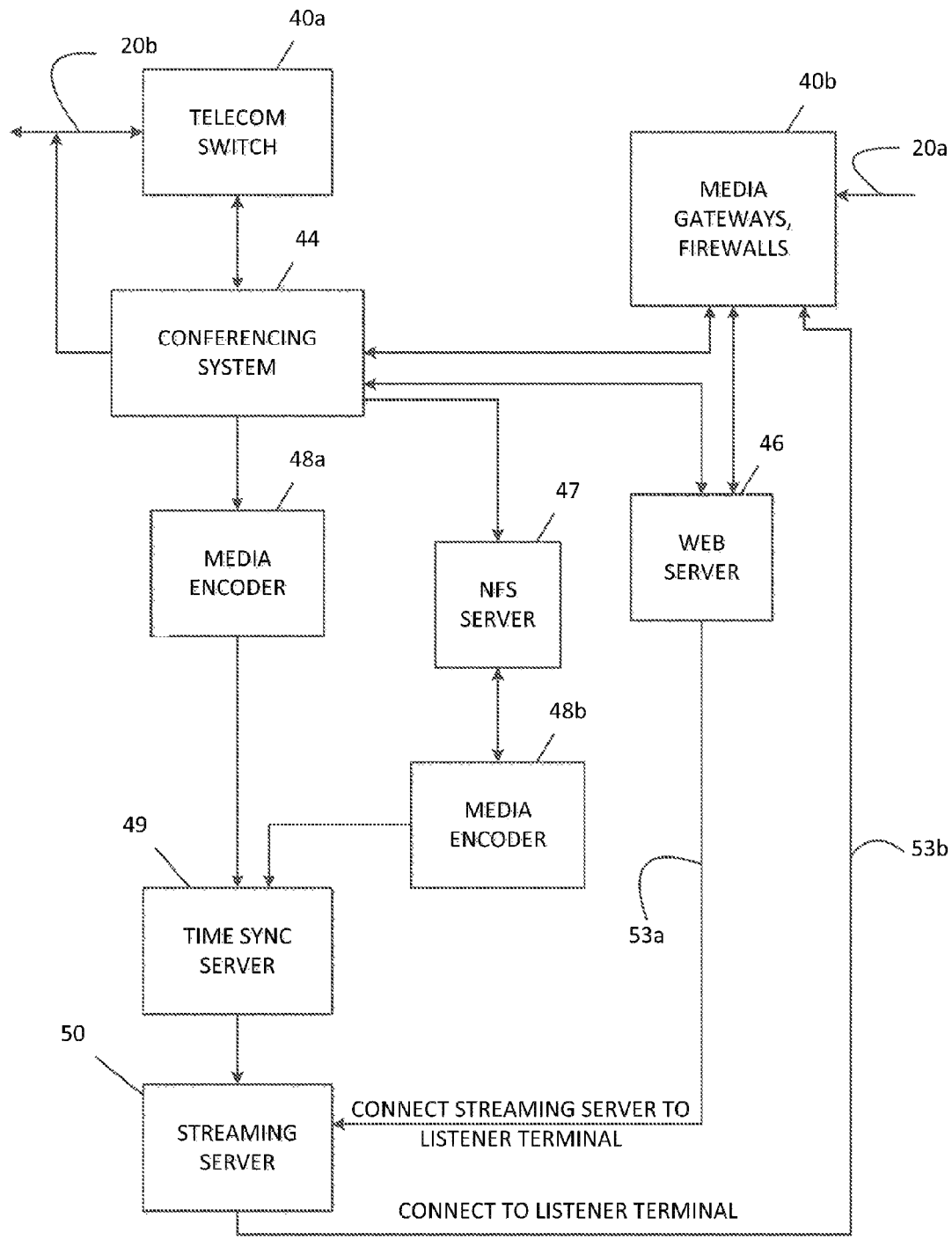
FIG. 2 illustrates a schematic representation of an audio server system constructed in accordance with example embodiments.

One embodiment of the audio server system 12 is shown in more detail in FIG. 2. The audio server system 12 is provided with one or more interface devices 40a and 40b for interfacing the audio server system 12 with the networks 20. In the example shown, the interface device 40a is shown as a telecom switch 40a for communicating with the switched network 20b, and the interface device 40b is shown as one or more media gateway, and firewall 40b for communicating with the packetized network 20a.

The audio server system 12 is also provided with a conferencing system 44, a web server 46, one or more NFS servers 47, one or more real-time media encoder 48a, one or more archive media encoder 48b, a time sync server 49, and a streaming server 50. The moderator terminal 14, and the guest terminal(s) 16 communicate with the conferencing system 44 via the networks 20a, 20b and interface devices 40a and 40b to provide a telephone conference connection for two-way audio communication during the network-based audio/video conference. The listener terminal(s) 18 communicate with the conferencing system 44, or the streaming server 50 to receive one-way or two-way communication during the network-based audio/video conference. When the listener terminal(s) 18 communicate with the conferencing system 44 in a two-way manner, i.e., unmuted, such listener terminal(s) 18 are functioning similar to guest terminal(s) 16.

The real-time media encoder 48a receives, in real-time or near real-time, the audio data (or a representation thereof) of the network-based audio/video conference and converts such audio data (or a representation thereof) into a streaming media format. Such audio data is then passed to a time sync server 49. The time sync server 49 can modify the streamed data by embedding transition indications in the data.

In example embodiments, the audio data may be formatted in the MP3 format. However, example embodiments are not limited thereto. MP3 data may include meta data tags, and these meta data tags may be ID3 tags. In at least one example embodiment, the time sync server 49 may modify ID3 tags in order to embed transition indications in the MP3 streamed audio data.

ID3 tags may be encoded using standard encoding formats. See, for example, ID3 tag version 2.4.0 (found at http://www.id3.org/id3v2.4.0-structure, last visited Aug. 3, 2012), incorporated herein by reference.

Referring to ID3 tag version 2.4.0, in at least one example embodiment, the time sync server 49 may embed server transition indications in a Frame ID field of an ID3 tag. In a further example embodiment, the time sync server may embed server transition indications in a variable-length padding field of the ID3 tag. However, these locations for embedded server transition indications are given as illustrative examples only, and the time sync server 49 may embed transition indications in other portions of the ID3 tag.

After the audio stream is embedded with transition indications, the audio data is then passed to the streaming server 50. The streaming server 50 receives the audio data in the streaming media format, and then, as will be discussed in more detail below provides the audio data in the streaming media format to the listener computers 18 via either the network 20*a*. The server transition indications, embedded in the audio data by the time sync server 49, may be read from the audio data by listener computers 18, as described below. Alternatively, listener computers 18 may disregard the embedded server transition indications.

During the audio/video conference, the conferencing system 44 outputs a representation of the audio data to the NFS server 47 to record the representation of the audio data and save such representation as a file. Once the audio/video conference is over, the file is output to the archive media encoder 48*b*, which encodes the representation of the audio data into a streaming format. This encoded data is input to the time sync server 49, described previously. The time sync server 49 then provides the representation of the audio data, embedded with transition indications, to the streaming server 50. A hyperlink or button may then be provided on a web page provided by the web server 46 containing a URL directing a listener terminal 18 to the representation of the audio data in the streaming format hosted by the streaming server 50. It should be understood that the real-time media encoder 48*a* and the archive media encoder 48*b* can be implemented as a same media encoder, or separately.

The audio server system 12 also includes the web server 46. The web server 46 functions as an interface between the conferencing system 44 and the streaming server 50 of the audio server system 12 and the network 20*a*, and runs web server software (stored on one or more computer readable medium) to generate and deliver various web pages for display at the moderator, guest and listener terminals 14, 16 and 18. As discussed in detail below, such web pages delivered by the web server 46 include various input sections and graphical user interfaces (GUIs) which enable (1) remote moderator users to interactively schedule, setup, and control two-way communication access to the network-based audio/video conference, (2) remote guest users to interactively join, communicate with the moderator and listen to the network-based audio/video conference, and (3) remote listeners to listen to the network-based audio/video conference or become guests. The web server 46 enables remote listeners to listen to the real-time or near real-time network-based audio/video conference by connecting the listener terminals 18 to the streaming server 50. In one embodiment, the web server 46 can also connect the listener terminal 18 to the conferencing system 44. This feature is described in more detail below.

In an exemplary embodiment, the various web pages provided by the web server 46 are available to the public via the network 20*a* and the web server 46 connects listener terminals 18 to the streaming server 50 without typically requiring any authentication, invitation or verification (in certain instances authentication or verification may be required, such as when the show includes explicit material—and—in certain instances the moderator can send out invitations to promote their show). So, the network-based audio/video conference is made available for essentially any listener having a listener terminal 18 capable of accessing the web server 46 and having streaming media software loaded on their listener terminal 18 for converting the representation of the audio data in the streaming media format into sound. As will be discussed in more detail below, due to the compatibility of the audio server system 12 with the packetized network 20*a* and the switched network 20*b* the moderator(s), guest(s) and listener(s) can setup, schedule, participate and/or listen to the network-based audio/video conference utilizing conventional telephones and computers having web browsers. Therefore, in one exemplary embodiment, the moderator terminal 14, the guest terminal 16 and the listener terminal 18 do not require any software specifically adapted to communicate solely with the audio server system 12.

2. Overview of Function of the Audio Conferencing System 10

During a network-based audio/video conference, audio is received by the conferencing system 44 from the two-way communication device 24, e.g., the telephone, of the moderator terminal 14 via the network 20*b*. The conferencing system 44 transmits a representation of the audio to guest terminal(s) 16 or listener terminal(s) 18 in a first listener group via the network 20*b*, and also transmits (or at least makes available) a representation of the audio to guest terminal(s) 16 or listener terminal(s) 18 in a second listener group via the packetized network 20*a*. The audio/video conference can be transmitted to the first listener group and the second listener group in realtime or near real-time (e.g., within a time delay of a few seconds).

A moderator can be a person who wishes to transmit voice, music, or any other suitable audio for one or more talk shows or audio/visual conferences and utilizes the moderator terminal 14 to communicate with the audio server system 12 via the network 20*a* or 20*b*. From the standpoint of the system 10, the moderator can be identified by a password (such as a PIN), but may be identified by any suitable method, such as CallerID or voice signature. A talk show or audio/visual conference can be scheduled for a particular day and time and may be scheduled for a particular timeslot (including start time and end time). However, in other embodiments, the talk show or audio/visual conference can be unscheduled or spontaneous. The talk show or audio/visual conference can be associated with a particular moderator (or moderators). A talk show or audio/visual conference can be described as scheduled, pre-show, in progress, or completed. The web server 46 can be adapted to permit the moderator to invite guests or listeners to the audio/video conference. In this regard, the moderator can login to a computer system hosted by the web server 46 and customize and send e-mail invites to friends and colleagues.

A "guest" is a listener who wishes to listen to the talk show or audio/visual conference and also engage in two-way communication with the moderator(s) during the talk show or audio/visual conference. From the standpoint of the system 10, the guest may be identified by a password (such as a PIN), or any other suitable method, such as CallerID or voice signature.

A "listener," or "first listener", or "second listener" is a person who wishes to listen to or view the talk show or audio/visual conference and receive the voice, music, or other suitable audio from the moderator and/or guest. From the standpoint of the system 10, a listener can be authenticated or verified, or not, by any particular method such as a password (such as a PIN), callerID or voice signature, although certainly the telephone number, IP address or other identifier of the listener terminal 18 may be automatically provided to the audio server system 12 for an identification of the listener terminal 18.

A first listener group is one or more listeners or guests in separate locations. A second listener group is one or more listeners or guests in separate locations from the listeners or guests in the first listener group.

An audio/visual conference can be either unidirectional or bi-directional, for example, participants might only be able to receive information but not input information or communicate back in the conference. Audio/visual conferences can contain only audio, only video, or both audio and video. All combinations of these embodiments are contemplated.

A "computer readable medium", as used herein, refers to a device capable of storing data in a format that can be read by a computer. Examples of "computer readable mediums" include a memory, a magnetic disk, an optical disk or a tape.

3. Receiving and Transmitting Audio

A person seeking to be a "moderator" typically visits the web server 46 utilizing their moderator computer 22 and signs up for a show and agrees to a password. Then, the web server 46 provides the moderator with a moderator telephone number. After the moderator signs up for a show and agrees to a password, the moderator can call the moderator telephone number and identifies themselves with the password, as shown in FIG. 2 to connect to the conferencing system 44. If there is a show scheduled to start within a predetermined period (such as 15 minutes), an audio signal is transmitted to the moderator (as a pre-recorded voice) indicating the time until the start of the show. During the talk show or audio/visual conference, audio is typically passed from the moderator terminal 14 via the network 20*b* to the conferencing system 44. The audio may be transmitted through the circuit-switched telephone network 20*b* using any suitable audio codec. The telecom switch 40*a* can evaluate the caller ID of the moderator, and uses the G.729 audio codec for phone calls from an international (or remote) location and the PCMU audio codec for phone calls from a domestic (or nearby) location. However, other types of audio codecs could be used.

Then, a representation of the audio is transmitted to the guest terminal 16 or listener terminal 18 of one or more listeners or guests in a first listener group via the telecom switch 40*a* and network 20*b* to deliver a representation of the voice, music, or any other suitable audio from the moderator to one or more guests and listeners. The representation of the audio may be an exact representation of the voice, music, or any other suitable audio transmitted from the moderator. The representation of the audio, however, is can be a compressed, filtered, censored, or otherwise processed version of the voice, music, or any other suitable audio transmitted from the moderator. The audio may be transmitted through the circuit-switched telephone network 20*b* using any suitable audio codec. The audio method and system can evaluate the caller ID of the moderator, and can use the G.729 audio codec for phone calls from an international (or remote) location and the PCMU audio codec for phone calls from a domestic (or nearby) location. However, other types of codecs could be used.

The audio server system 10 can provide the first listener group with a listener telephone number that corresponds to a particular moderator or show. The listener telephone number is typically provided to the guests or listeners in the first listener group by posting the listener telephone number on a web page associated with the particular moderator or show provided by the web server 46. However, the listener telephone number can be provided in other manners, such as by including the listener telephone number in advertisements for the talk show or audio/visual conference.

When a first listener calls the listener telephone number, the conferencing system 44 may be configured to play an audio clip (such as a "greeting") associated with the particular moderator or show. If there is a show scheduled to start within a predetermined period (such as 15 minutes), the conferencing system 44 can transmit an audio signal to the first listener (as a pre-recorded voice) indicating the time until the start of the show. Although the audio/video conference system 10 might not require a password from the first listener, the system 10 may require a password from the first listener in certain situations (e.g., shows with explicit material).

The audio server system 12 can also transmit or pass a representation of the audio to a second listener group in real-time or near real-time via the network 20*a*. The representation of the audio is automatically provided to the media encoder 48*a* and the NFS server 47 from the conferencing system 44. The NFS server 47 records the representation of the audio (in real-time or near real-time) and saves the representation as a file. The real-time streaming of the representation of the audio can be accomplished by setting the media encoder 48*a* up as a "listener" of the audio/video conference. In one embodiment, this is accomplished by placing an inbound or outbound phone call to the media encoder 48*a* by the conferencing system 44 to connect the media encoder 48*a* as a "listener" of the audio/video conference. The connection between the conferencing system 44 and the media encoder 48*a* can utilize a high quality codec.

As discussed above, the audio stream can be provided to the listener or the guest utilizing either the network 20*a* or 20*b*. To listen to the audio stream utilizing the network 20*a*, the listener or guest utilizes their guest terminal 16 or listener terminal 18 to browse a web page associated with the moderator, talk show or audio/visual conference. The web page can be provided with suitable hyperlink(s) (see for example the hyperlink 174 shown in FIG. 14) adapted to provide a listener URL, that corresponds to a particular moderator or show, to the listener terminal 18 upon activation by the listener. When the listener points their web browser to the particular URL, the audio server system 12 connects the listener terminal 18 to the streaming server 50 to connect the listener to the audio stream. This can be implemented by the web server 46 sending a signal via a signal path 53*a* to the streaming server 50 to activate the streaming server 50 to connect to the listener terminal 18 via a signal path 53*b*, or by the web server 46 providing the listener URL to the listener terminal 18 and then the listener terminal 18 connecting to the streaming server 50 via the signal path 53*b*. The signal paths 53*a* and 53*b* are shown separately for purposes of illustration, however, the signal paths 53*a* and 53*b* could be the same or different.

To connect to the audio/video conference via the network 20*b*, the moderator, guest or listener uses their terminal 14, 16 or 18 to dial into the audio/video conference utilizing a "call-in" number. Or, the moderator, guest or listener can utilize their terminal 14, 16 or 18 to view a web page from the web server 46 and actuate a hyperlink that actuates an outbound call to connect to the conferencing system 44 using Voice Over IP via the networks 20*a* and the media gateways, firewall 40*b*.

The streaming server 50 may be configured to play an audio and/or video clip (such as a "greeting") associated with the particular moderator or show. If there is a show scheduled to start within a predetermined period (such as 15 minutes), the system 10 can include a step of transmitting an audio and/or video signal to the listener indicating the time until the start of the show. Although the system 10 might not require a password from the second listener, the system 10 may require a password from the second listener in certain situations (e.g., shows with explicit material).

3. Example Implementation

FIGS. 3-9 are exemplary web pages generated by a web server of the audio server system in accordance with embodiments. In particular, FIGS. 3-9 illustrate exemplary web pages enabling the moderator to control the network-based audio/video conference in accordance with example embodiments.

Figure 3:
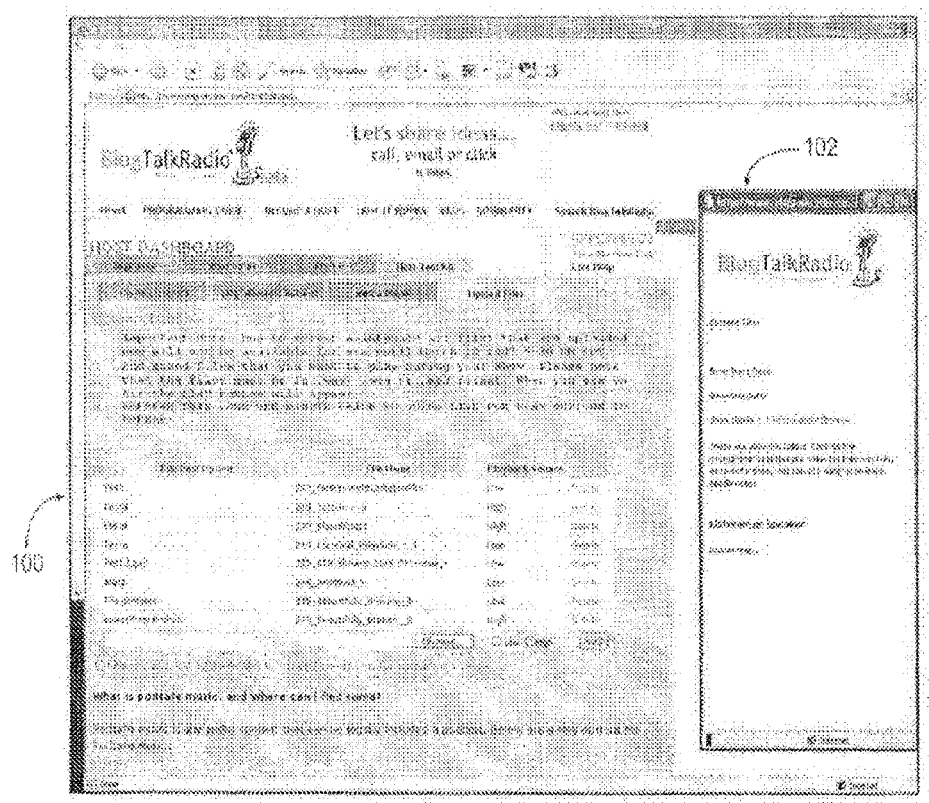
FIG. 3 illustrates exemplary "upload files" and "moderator status" web pages generated by a web server of the audio server system in accordance with example embodiments.

Shown in FIG. 3 is an exemplary "upload files" web page 100 generated by the web server 46 of the audio server system 12 in accordance with an embodiment. The "upload files" web page 100 has an upload file area to permit the moderator to upload sound files to the audio server system 12 for playing during the audio/video conference. The sound files can be in any suitable format, such as .wav, .wma or .mp3 format. When the moderator is hosting the audio/video conference, the upload files page will include a "play button" or other suitable hyperlink permitting the moderator to play the sound files during the audio/video conference.

Figure 6:
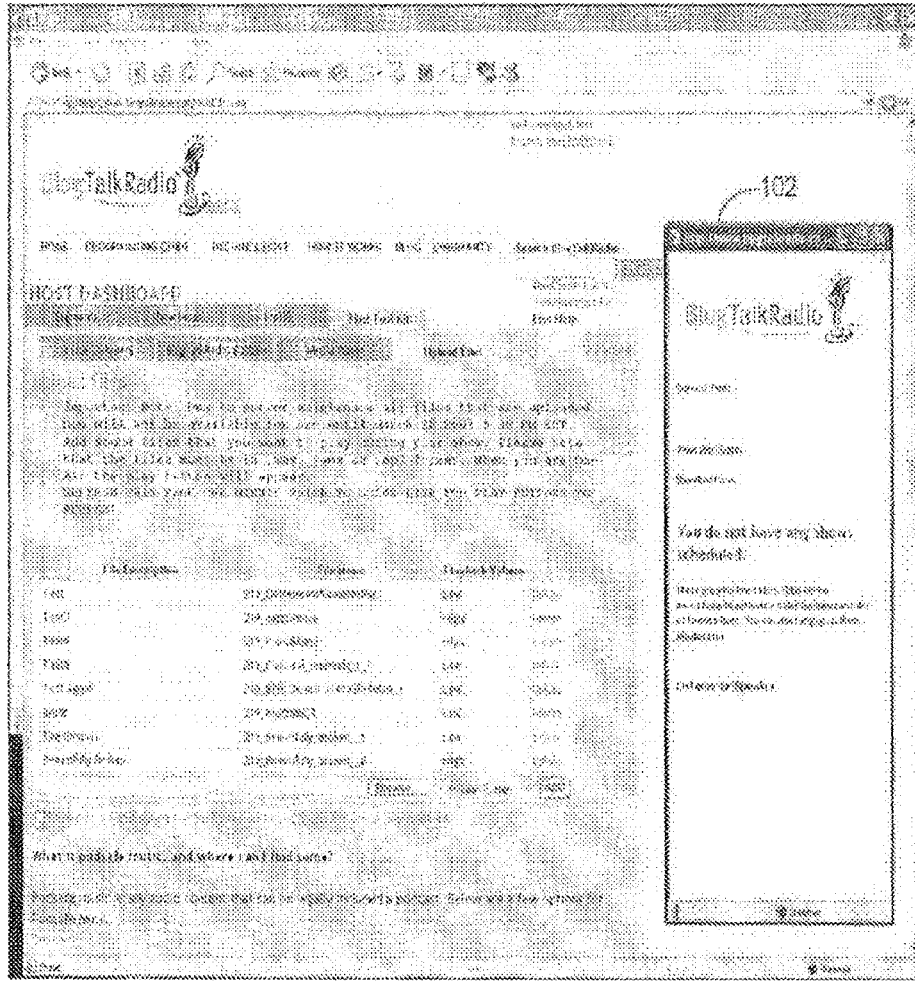
FIG. 6 illustrates another exemplary "moderator status" web page generated by the web server of the audio server system in accordance with example embodiments.
Figure 7:
FIG. 7 illustrates yet another exemplary "moderator status" web page generated by the web server of the audio server system in accordance with example embodiments.
Figure 8:
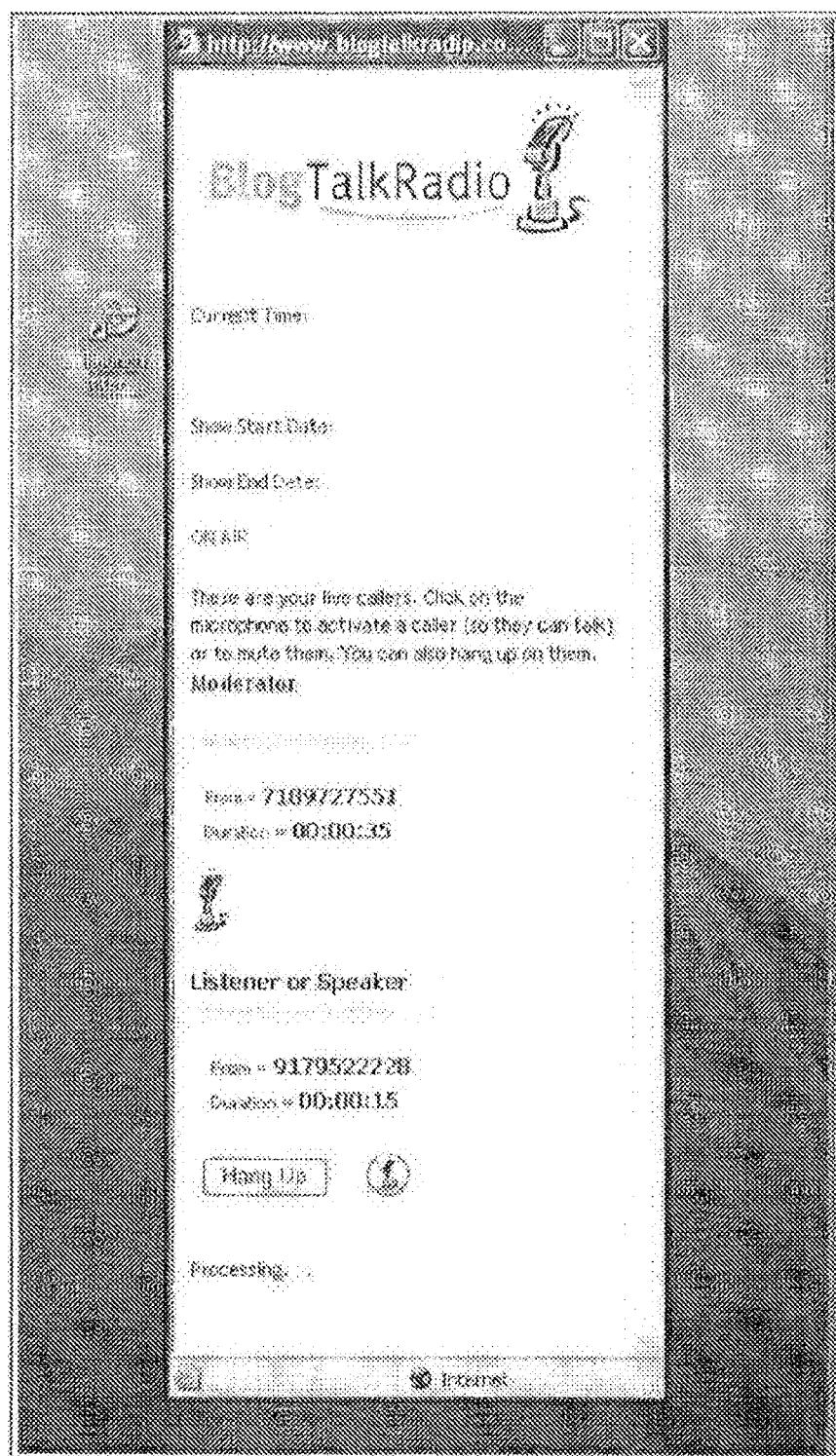
FIG. 8 illustrates another exemplary "moderator status" web page generated by the web server of the audio server system in accordance with example embodiments.

Shown in FIGS. 3, 6, 7 and 8 are exemplary "moderator status" web pages 102 generated by the web server 46 of the audio server system 12. The "moderator status" web page 102 includes the current status of the audio/video conference. As shown in FIG. 3, the moderator does not currently have any shows scheduled. As shown in FIG. 6, the web page 102 indicates that the show will start in 1 minute and 4 seconds. As shown in FIG. 7, the web page 102 indicates that the show has started and that the moderator needs to call into the show. As shown in FIG. 8, the show has started and one listener or speaker, i.e., guest, is currently listening to the show.

Figure 4:
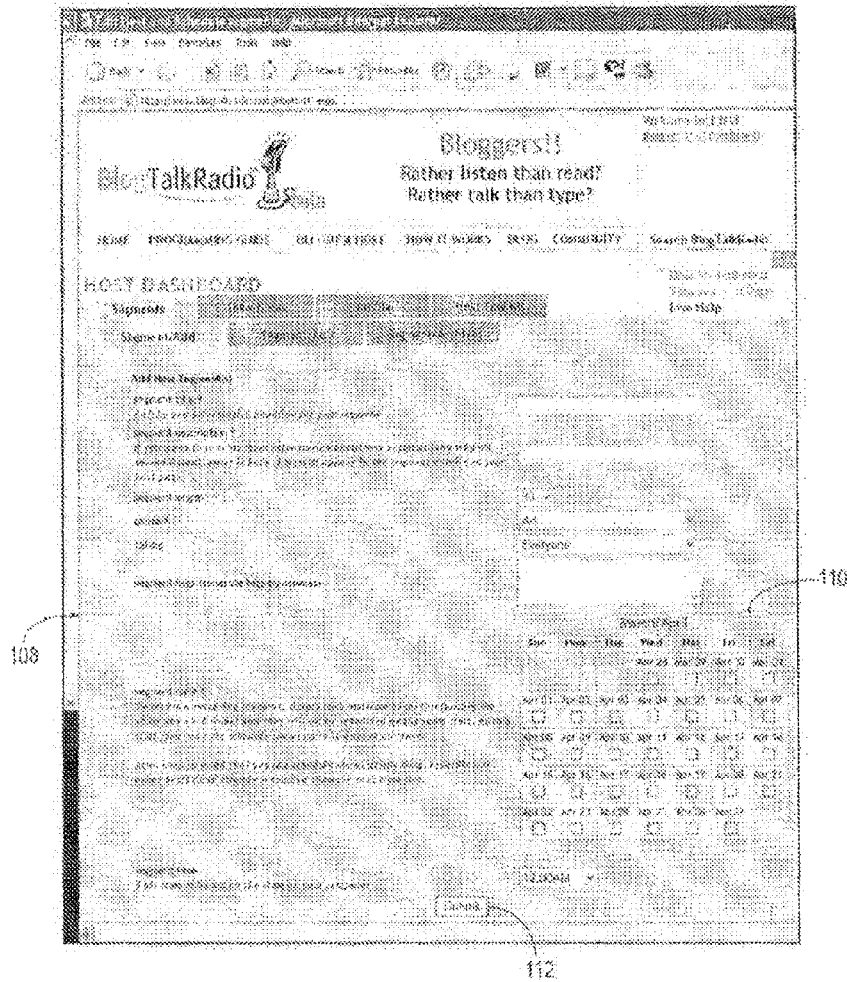
FIG. 4 illustrates exemplary "Segments" web page generated by the web server of the audio server system in accordance with example embodiments.

Referring to FIG. 4, shown therein is an exemplary "Segments" web page 108 generated by the web server 46 of the audio server system 12. The "segments" web page 108 includes a variety of fields permitting the moderator to schedule various information with respect to a proposed talk show or audio/visual conference, such as segment title, segment length, genre, rating, or segment tags. In addition, the "segments" web page 108 includes a scheduling area 110 permitting the moderator to select the date and time of the proposed talk show or audio/visual conference, as well as a select button 112 enabling the moderator to submit the schedule of the proposed talk show or audio/visual conference.

Figure 5:
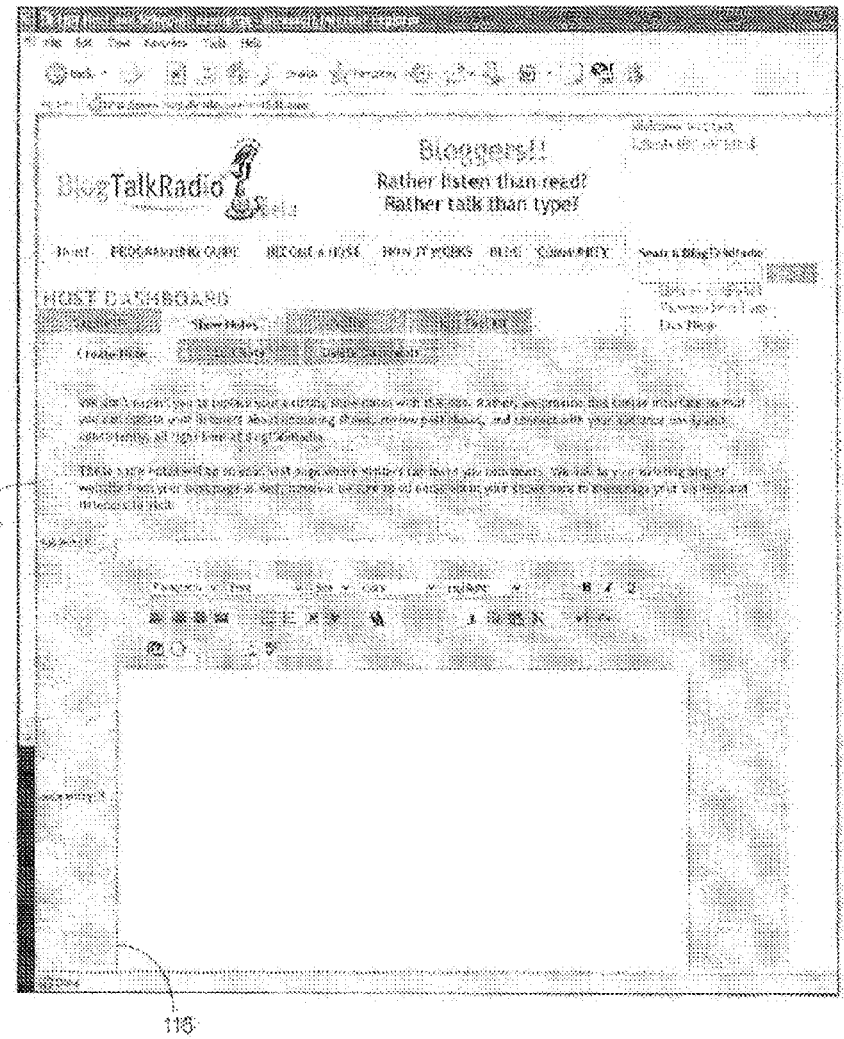
FIG. 5 illustrates exemplary "Show Notes" web page generated by the web server of the audio server system in accordance with example embodiments.

Referring to FIG. 5, shown therein is an exemplary "Show Notes" web page 114 generated by the web server 46 of the audio server system 12. The "show notes web page 114 has a note area 116 permitting the moderator to provide notes to listeners or guests. Once notes are entered into the "show notes" web page, such notes are then provided to listeners or guests of the show by the web server 46.

Figure 9:
FIG. 9 illustrates an exemplary "segment/archives" web page generated by the web server of the audio server system in accordance with example embodiments.

Referring to FIG. 9, shown therein is an exemplary "segment/archives" web page 120 generated by the web server 46 of the audio server system 12. The segment archives web page provides a list of prior shows, organized by moderator, which have been recorded and are available to listen to.

Figure 10A:
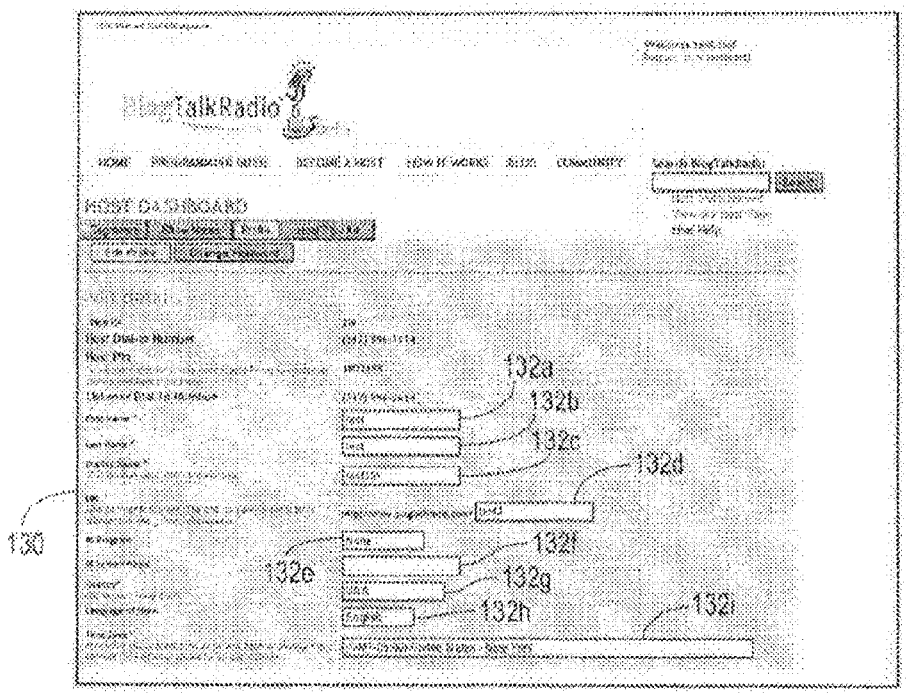
FIGS. 10a and 10b cooperate to illustrate an "edit profile" web page generated by the web server of the audio server system in accordance with example embodiments.
Figure 10B:
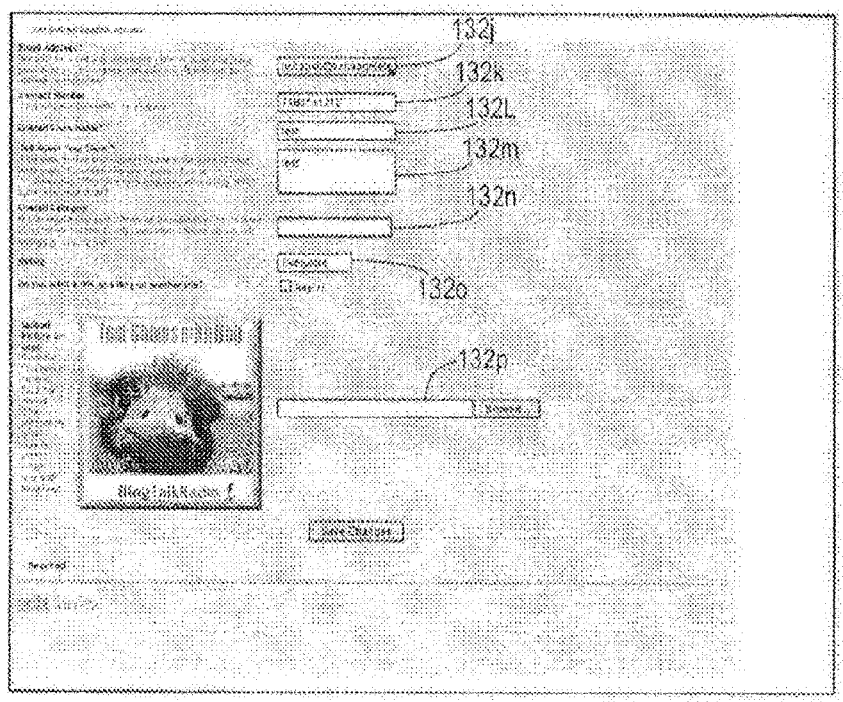

FIGS. 10a and 10b cooperate to illustrate an "edit profile" web page 130 generated by the web server 46 of the audio server system 12. The web page 130 includes a variety of fields 132a-p for collecting information related to the moderator. Examples of such information include first name, last name, display name, URL address for linking to the moderator's home page, instant messaging program, instant messaging screen name, country of residence, language of show, time zone, e-mail address, contact telephone number, overall show name, description of show, rating, and overall category for submitting the show to podcast directories automatically, and a picture or logo for the show.

Figure 11:
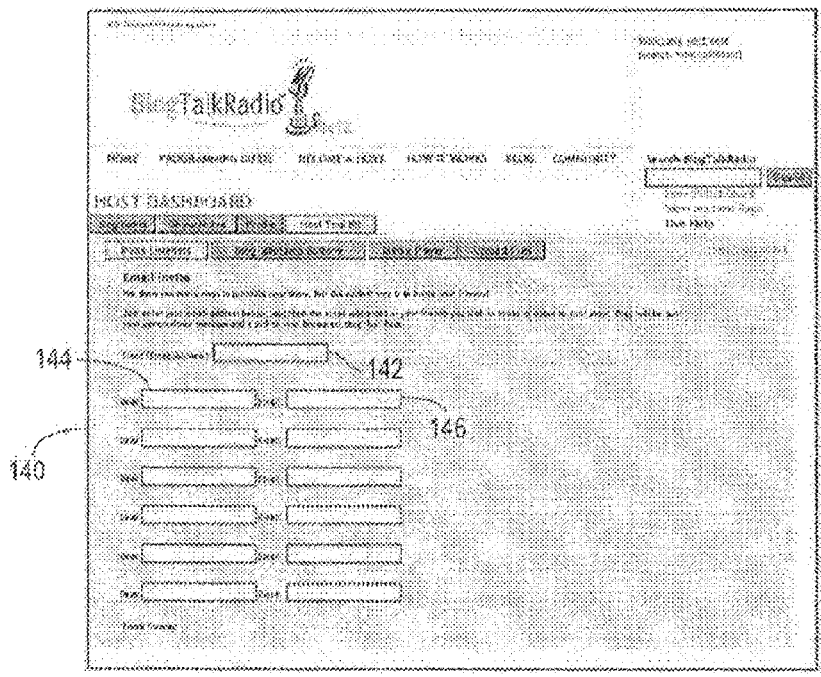
FIG. 11 illustrates an "invite listeners" web page generated by the web server of the audio server system in accordance with example embodiments.

FIG. 11 illustrates an "invite listeners" web page 140 generated by the web server of the audio server system in accordance with an embodiment. The web page 140 includes a variety of fields 142, 144 and 146 which permit the moderator to enter their e-mail address, and the name and e-mail address of the invitee. Then, the web server 46 utilizes the information in such fields, along with the show's schedule to send out invitations to potential listeners.

Figure 12:
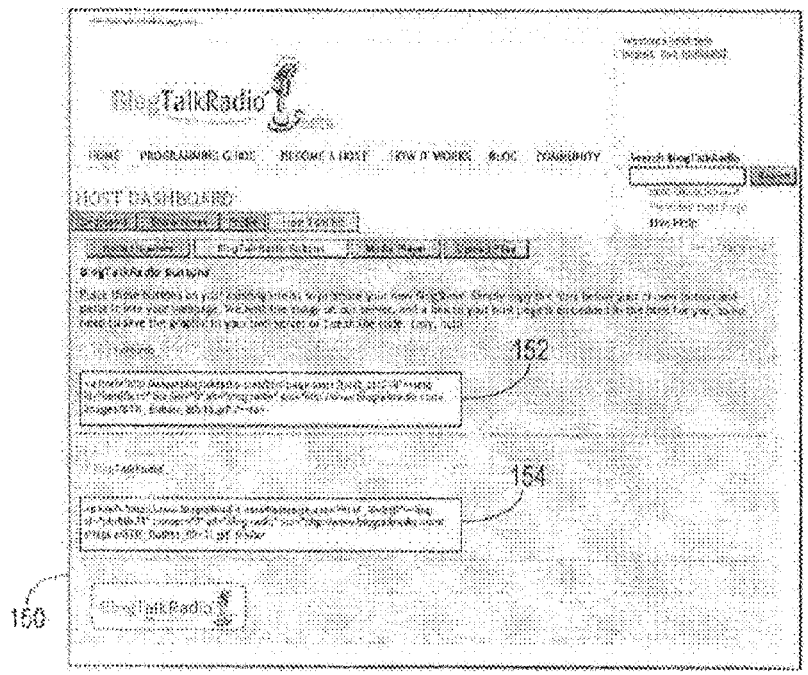
FIGS. 12 and 13 illustrate web pages generated by the web server of the audio server system in accordance with embodiments for automating the placement of buttons or hyperlinks on a moderator's web page.
Figure 13:
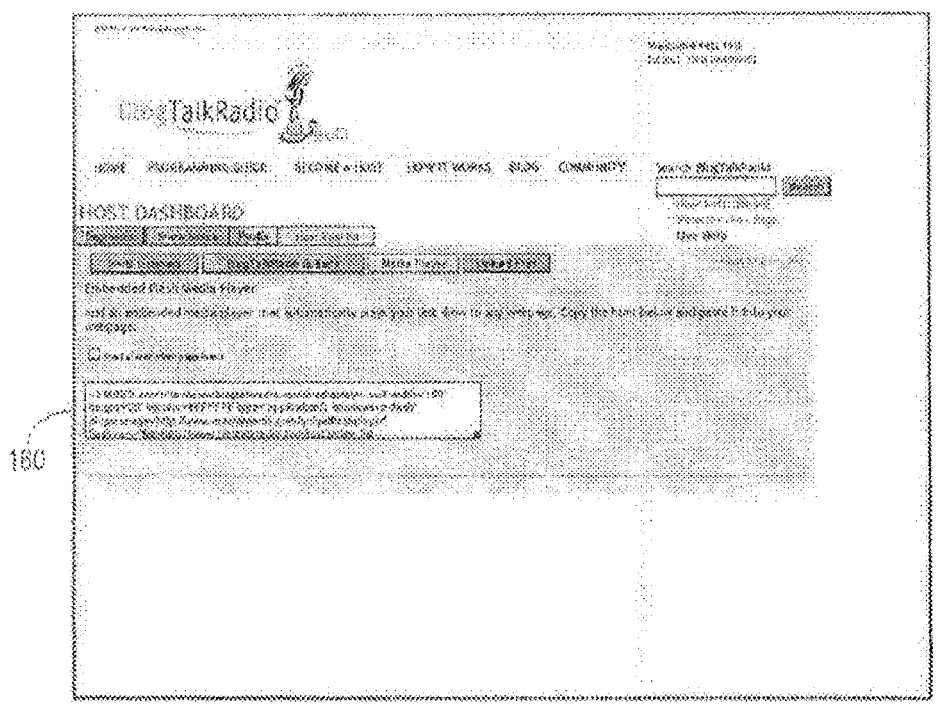

FIGS. 12 and 13 illustrate web pages 150 and 160 generated by the web server 46 of the audio server system 12 for automating the placement of buttons or hyperlinks on the moderator's web page. For example, the web page 150 includes one or more fields 152 and 154 containing instructions that can be copied and pasted onto the moderator's web page to form a button or hyperlink linking the moderator's web page with either a URL associated with a past or ongoing show to permit a connection to the streaming server 50. The moderator web page is typically not hosted by the web server 46. For example, the moderator could have a separate blog or web-site. It should be understood that the instructions in the fields 152 can be different to provide either different functionality or different style buttons or hyperlinks. Likewise, the web page 160 includes a field 162 containing instructions that can be copied and pasted onto the moderator's web page to form a button or hyperlink for downloading and setting up a suitable media player.

Figure 14:
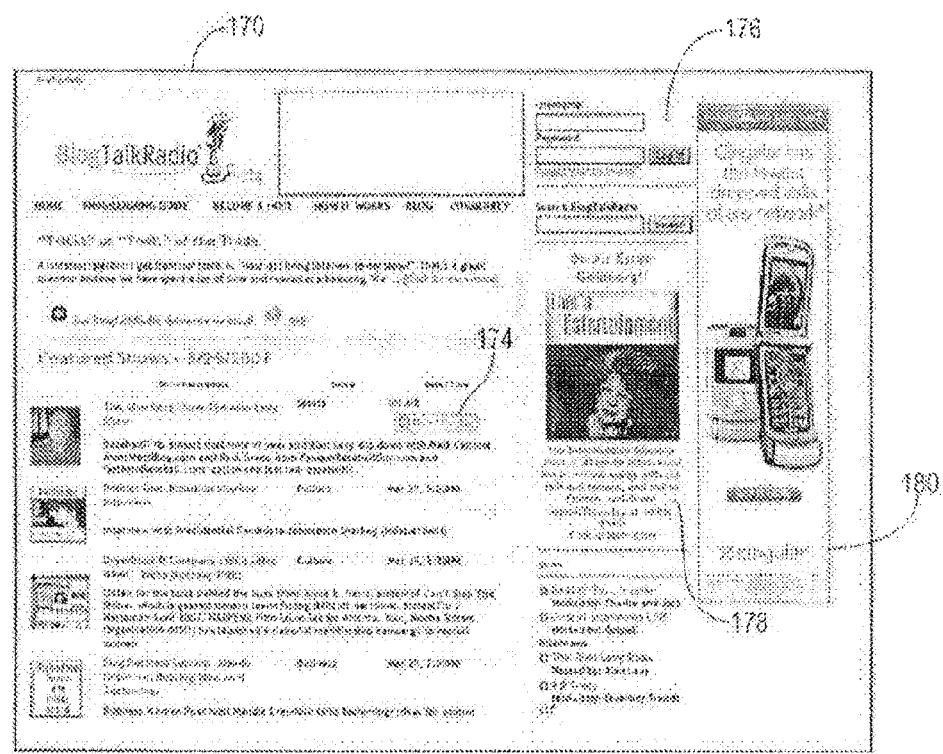
FIG. 14 illustrates a "featured shows" web page generated by the web server of the audio server system in accordance with example embodiments.

FIG. 14 illustrates a "featured shows" web page 170 generated by the web server 46 of the audio server system 12. The web page 170 includes a featured show area 172 listing featured shows. In particular, it should be noted that in this example, the featured show area 172 includes a featured show (the Alan Levy show) that is ongoing, i.e., "on air". When a show is "on air", the featured show area 172 is provided with a button or hyperlink 174 permitting the viewer to connect to the streaming server 50 to hear the real-time or near real-time audio stream of the audio/video conference.

The web page 170 also includes a login area 176 permitting moderators to login to their account. The web page 170 also includes a variety of advertising areas 178 and 180.

In the exemplary embodiment, the starting of the show includes: playing a 5-second countdown to the start of the show to the moderator, updating the status of the show in a database, starting the transmission of audio to both the first listener group and the second listener group to the audio/video conference, transmitting a jingle corresponding to the company that provides the audio/video conference services, and transmitting a greeting for the particular moderator or show. At this point, the show is in progress—the moderator is able to send audio into the audio/video conference and the listeners will be able to hear the audio. In addition, in an exemplary embodiment, the conferencing system 44 sends a beep or other signal only to the moderator terminal 14 when a new guest or listener is added to the show.

In the exemplary embodiment, the ending of the show includes: transmitting a countdown to the end of the show, a "goodbye" for the particular moderator or show, and an end prompt corresponding to the company that provides the audio/video conference services, terminating the transmission via the networks 20a and 20b, de-allocating the media server resources, and updating the status of the show in a database.

In the exemplary embodiment, the conferencing system 44 of the audio server system 10 is programmed to reconnect a moderator upon a disconnection of the moderator from the audio/video conference without ending the audio/video conference. That is, a moderator may become improperly disconnected from the audio/video conference through an accidental hang-up, through a fault of the telephone network, through the fault of the company providing the audio/video conference service, or through any other method. After such disconnection, the conferencing system 44 might not terminate the audio/video conference or stream for a predetermined period (such as five minutes or until the scheduled end of the show) to permit the moderator to re-connect. During the five minutes, if the moderator calls the moderator telephone number and is properly identified (through a password or any other suitable method), then the moderator can be immediately reconnected to the audio/video conference. The conferencing system 44 may transmit a "calling back into the show" prompt to the listeners or guests.

4. Variations on the Exemplary Embodiments

The audio server system 12 can record a representation of the audio. The recording may include a recording of part or all of a show. The form of the recording can be an MP3 format or other suitable format that can be easily uploaded and downloaded via the Internet in a RSS, podcast, or other suitable manner. The recording of the audio can be accomplished by connecting the NFS server 47 as a "listen-only" participant of the audio/video conference. This can allow the audio and transition indications to be stored into NFS server 47. The recording may, however, be accomplished by any appropriate portion of the system. A link to the recording may be provided on a web page and provided to listeners via the web server 46 after the termination of the audio/video conference.

The web server 46 of the audio server system 12 may also provide web pages containing information to the moderator related to the audio/video conference via a packet-switched network 20a (such as the Internet) and a web browser. The information can be provided in visual form, but may alternatively be provided in audio, tactile, or any other suitable form. The information can be provided to the moderator during the show, in real-time or near real-time (within a few seconds). The information can include information on the show, such as the scheduled start time, the scheduled end time, and/or a countdown to the scheduled end time. The information can include information on the listeners, such as one or more of the following: the number of first listeners in the first listener group, the CallerID of a first listener in the first listener group, the number of second listeners in the second listener group, the (approximate or exact) location of the second listeners in the second listener group. Exemplary web pages are shown in FIGS. 3-13.

In a variation of the exemplary embodiment described above, the method and system may also include receiving input from the moderator via the packet-switched network 20b to allow a listener to add audio to the audio/video conference. A listener (of either the first listener group or the second listener group) can signal to the moderator that they wish to contribute to the audio/video conference. A listener from the first listener group can use a dual-tone multi-frequency (DTMF) signal (such as "press '1' on your touch-tone phone if you want to contribute to the audio/video conference). A listener from the second listener group can send a SMS, an email, or clicks a button on their browser (such as "click here to contribute to the audio/video conference"). Upon such signal, the listener is added to a listener queue. The listener queue can be ordered by the order in which the listener made a signal to contribute, with earlier requests at the front of the listener queue. The listener queue can be provided to the moderator via a packet-switched network (such as the Internet) and a web browser.

After providing the listener queue to the moderator, the moderator may choose to allow one or more of the listeners to contribute to the audio/video conference. The method and system can include the step of accepting an input from the moderator via the Internet to join the listener into the audio/video conference, receiving audio from the listener, and transmitting a representation of the audio from the listener to the first listener group via the circuit-switched telephone network, and transmitting a representation of the audio from the listener to the second listener group via a packet-switched network. The step of accepting an input from the moderator via the Internet can include accepting a simple "point and click" command from the moderator via a web browser, but may include any suitable method such as voice-recognition (e.g., "now connecting caller on line #2"). The step of accepting audio from the listener via a circuit-switched telephone network functions to accept voice, music, or any other suitable audio transmitted from the listener through the circuit-switched telephone network. The audio may be transmitted through the circuit-switched telephone network using any suitable audio codec. The method and system can evaluate the caller ID of the moderator, and use the G.729 audio codec for phone calls from an international (or remote) location and the PCMU audio codec for phone calls from a domestic (or nearby) location. However, other codecs could be used. The representation of the audio may be an exact representation of the voice, music, or any other suitable audio transmitted from the listener. The representation of the audio, however, can be a compressed, filtered, censored, or otherwise processed version of the voice, music, or any other suitable audio transmitted from the listener. The representation may include only audio from the listener, or may include audio from both the listener and the moderator.

In a further variation of the exemplary embodiment described above, the moderator may control additional aspects of the audio/video conference in real-time or near real-time via a packet-switched network (such as the Internet) and a web browser. The additional controls include: muting or un-muting a listener, increasing or decreasing the volume of a listener, calling a listener (with or without a private chat), disconnecting a listener, playing, pausing, and stopping an audio file that combines with or substitutes for the audio from the moderator, and ending the audio/video conference. The moderator can place an outdial call through the conferencing system 44 to connect a guest or listener. The outdial request can contain a parameter indicating whether or not to provide a private chat with the listener prior to adding them to the audio/video conference. The listener can be added to the audio/video conference in full-duplex mode.

Figure 15:
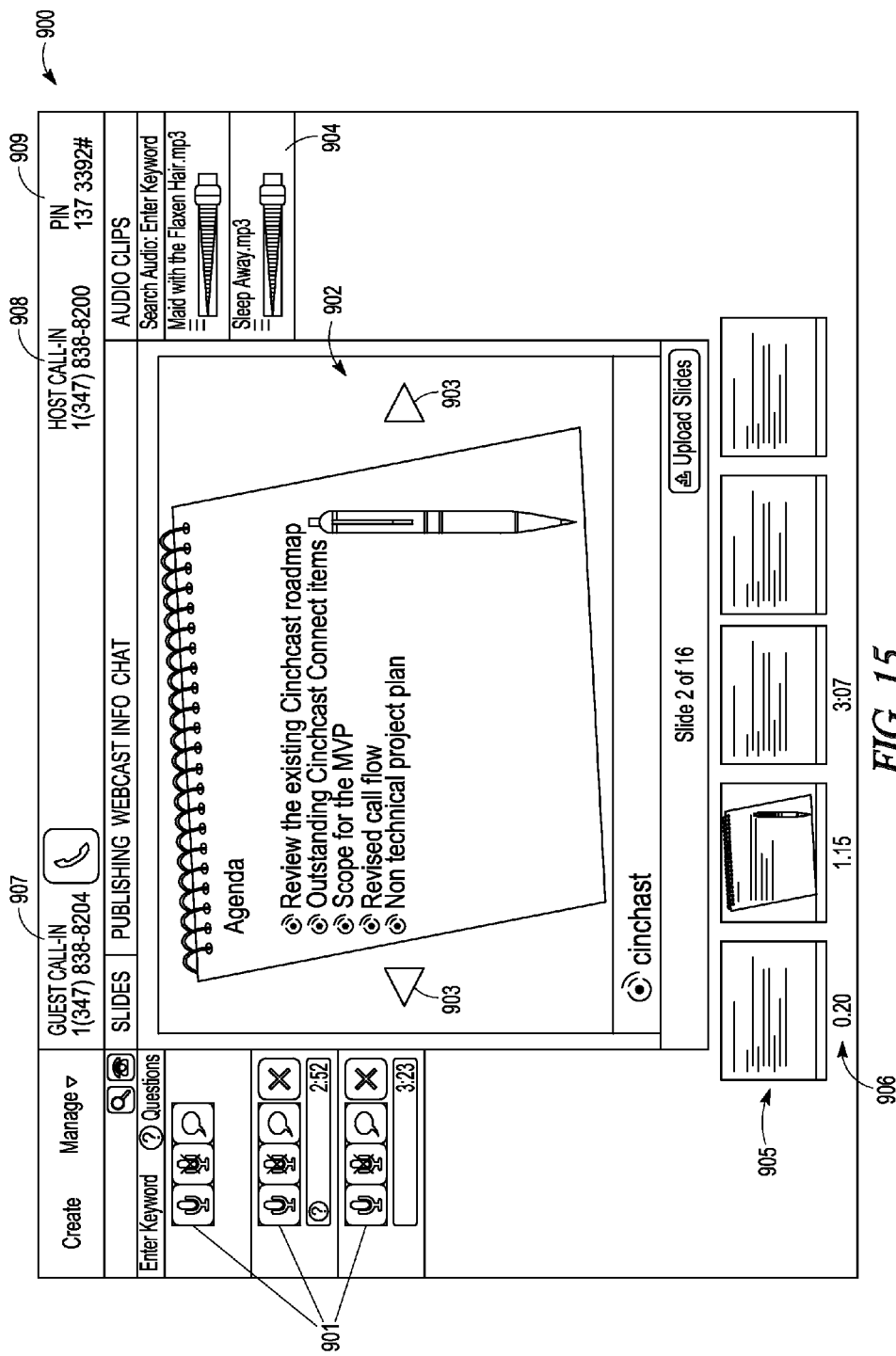
FIG. 15 illustrates an exemplary control panel for moderating an audio visual conference.

Referring to FIG. 15, in at least one example embodiment of a control panel 900, includes one or more controls 901 that can be used for muting, unmuting, adding and subtracting guests from the audio visual conference. The control panel 900 can include a slide window 902 for presenting slides and buttons 903 for transitioning slides. When a moderator activates one of the buttons 903, an indication can be stored in an ID3 tag, or other portion, of the audio stream to indicate a slide transition. The control panel 900 can include a preview bar 905 for indicating when slide transitions occur 906. For example, FIG. 15 illustrates slide transitions at :20, 1:15, and 3:07. The audio stream can include indications of these slide transitions at those times 906. Finally, the control panel 900 can include an audio control panel 904 for playing and controlling the volume of various audio files, including "Maid with the Flaxen Hair.mp3" and "Sleep Away.mp3". Finally, in can be useful to identify a guest call-in number 907, a host call-in number 908, and a PIN 909 in the control panel 900, such that the moderator has this information when needed.

As will be appreciated, in above-described embodiments using packet-switched communications over network 20a, latency times may be introduced such that the signal to switch to a different video data slide is not received in a synchronized fashion relative to the audio signal. In an example embodiment, therefore, timing data is embedded in the streamed audio data to provide synchronization of audio and video data.

As described above with respect to FIG. 2, a time sync server 49 can embed transition indications in an MP3 audio stream. Upon examining the MP3 audio stream and reading the embedded transition indications, the player or browser on which the user is listening to the presentation can synchronize the video data slides with the audio stream. In an example embodiment, the user's listening device transitions the slides of video data based on, for example, the ID3 MP3 tags placed in the audio stream. A plugin can be implemented that can decode the transition indications, and in response, transition or display new visual information, such as a slide. In this way, the audio will become synchronized with the video data slide display.

In at least one example embodiment, the moderator may use a VoIP application to record the conference call. In at least this example embodiment, real-time transport protocol (RTP) streaming permits the time sync server 49 to embed time markers in the meta data as discussed with respect to FIG. 2.

In example embodiments, the embedded transition indications may be relative to each other, in other words the embedded transition indications may be in the form of offset values relative to other embedded transition indications. For example, the transition indication can indication that a transition must occur, or new information displayed, a certain time after the previous transition indication. In other embodiments, the embedded transition indications may be absolute; for example, transition or display new information after a certain time or receiving the latest transition indication. In still further example embodiments, the embedded transition indications may be set to transition or display new information based on the local time in order to account for users being in different locations or in different time zones; for example, new information or a transition can occur at the stroke of midnight on New Year's Eve. The embodiment described above discusses using VOIP and RTP, but other embodiments can include using recording audio received over PSTN, and the times can be embedded in the audio stream recorded from the PSTN.

It will be understood that the above-described features for synchronizing the audio and video data may be used for streaming of video, video games, or other data that includes audio and visual components.

As a person skilled in the art will recognize from the previous detailed description and from the figures and claims, modifications and changes can be made to the exemplary embodiments of the invention without departing from the spirit and scope of this invention defined in the following claims.

We claim:

1. A method of facilitating an audio/video conference comprising:

providing, by an audio server system, a host dashboard, the host dashboard configured to enable a moderator to invite one or more guests to participate in the conference call based on information provided by the audio server system, the audio server system enabling the moderator to engage in bi-directional communication with the invited one or more guests;

initiating, by the audio server system, the conference call based on a moderator request received via the host dashboard; and streaming, by the audio server system, audio associated with the conference call to one or more of the moderator, the one or more guests, and the one or more listeners, the one or more listeners connecting with the conference call using one or more unidirectional network interfaces offered in conjunction with the audio server system, the one or more listeners being provided a unidirectional communication capability associated with the conference call.

2. The method of claim 1, further comprising providing the moderator with a telephone number that corresponds to a moderator position within the audio/video conference.

3. The method of claim 1, further comprising maintaining the conference upon disconnection of the moderator from the conference, and reconnecting the moderator to the audio/video conference.

4. The method of claim 1, further comprising providing each of the one or more guests with a telephone number that corresponds to a listener position within the audio/video conference.

5. The method of claim 1, further comprising providing each of the one or more listeners with a URL that corresponds to a listener position within the audio/video conference.

6. The method of claim 1, wherein streaming the conference call to the one or more listeners via the Internet includes encoding and streaming a representation of the audio.

7. The method of claim 1, further comprising displaying information to the moderator related to the audio/video conference via the Internet.

8. The method of claim 7, wherein the information includes the caller identification of each of the one or more guests.

9. The method of claim 1, further comprising:

receiving inputs indicative of transition indications from the moderator;

embedding, in response to the inputs, transition indications in the audio associated with the conference call; and transitioning slides upon receiving an embedded transition indication.

10. The method of claim 9, wherein the embedding the transition indications comprises embedding the transition indications in meta data tags associated with segments of the audio.

11. The method of claim 10, wherein the meta data tags are MP3 ID3 tags.

12. A server comprising:

a network adapter through which to communicate with a plurality of client devices via a network;

a memory device coupled to the network adapter and configured to store code corresponding to a series of operations for providing the online communication platform to one or more of the client devices, the series of operations including, providing, by an audio server system, a host dashboard configured to enable a moderator to invite one or more guests to participate in the conference call based on information provided by the audio server system, the audio server system enabling the moderator to engage in substantially real-time, bi-directional communication with the invited one or more guests;

initiating, by the audio server system, the conference call based on a moderator request received via the host dashboard; and streaming, by the audio server system, audio associated with the conference call to one or more of the moderator, the one or more guests, and one or more listeners, the one or more listeners connecting with the conference call using one or more unidirectional network interfaces offered in conjunction with the audio server system, the one or more listeners being provided a unidirectional communication capability associated with the conference call.

13. The server of claim 12, wherein the set of operations further comprises providing the moderator with a telephone number that corresponds to a moderator position within the audio/video conference.

14. The server of claim 12, wherein the set of operations further comprises maintaining the conference upon disconnection of the moderator from the conference, and reconnecting the moderator to the audio/video conference.

15. The server of claim 12, wherein the set of operations further comprises providing each of the one or more guests with a telephone number that corresponds to a listener position within the audio/video conference.

16. The server of claim 12, wherein the set of operations further comprises providing each of the one or more listeners with a URL that corresponds to a listener position within the audio/video conference.

17. The server of claim 12, wherein streaming the conference call to the one or more listeners via the Internet includes encoding and streaming a representation of the audio.

18. The server of claim 12, wherein the set of operations further comprises:
embedding transition indications in the audio associated with the conference call; and
streaming slides of video data, a slide of the video data being displayed at a time based on an embedded transition indication.

19. The server of claim 18, wherein the transition indications are embedded in meta data tags associated with the segments of the audio.

20. The server of claim 19, wherein the meta data tags are MP3 ID3 tags.

21. A non-transitory computer-readable storage medium storing instructions for providing an online communication platform, the instructions causing one or more computer processors to perform operations comprising:
providing, by an audio server system, a host dashboard configured to enable a moderator to invite one or more guests to participate in the conference call based on information provided by the audio server system, the audio server system enabling the moderator to engage in substantially real-time, bi-directional communication with the invited one or more guests;
initiating, by the audio server system, the conference call based on a moderator request received via the host dashboard; and
streaming, by the audio server system, audio associated with the conference call to one or more of the moderator, the one or more guests, and one or more listeners, the one or more listeners connecting with the conference call using one or more unidirectional network interfaces offered in conjunction with the audio server system, the one or more listeners being provided a unidirectional communication capability associated with the conference call.

22. The storage medium of claim 21, wherein the instructions further comprise:
providing the moderator with a telephone number that corresponds to a moderator position within the audio/video conference.

23. The storage medium of claim 21, wherein the instructions further comprise:
maintaining the conference upon disconnection of the moderator from the conference, and reconnecting the moderator to the audio/video conference.

24. The storage medium of claim 21, wherein the instructions further comprise:
comprising providing each of the one or more guests with a telephone number that corresponds to a listener position within the audio/video conference.

25. The storage medium of claim 21, wherein the instructions further comprise:
providing each of the one or more listeners with a URL that corresponds to a listener position within the audio/video conference.

26. The storage medium of claim 21, wherein streaming the conference call to the one or more listeners via the Internet includes encoding and streaming a representation of the audio.

27. The storage medium of claim 21, wherein the instructions further comprise:
embedding transition indications in the audio associated with the conference call; and
streaming slides of video data, a slide of the video data being displayed at a time based on an embedded transition indication.

28. The storage medium of claim 27, wherein the embedding embeds the transition indications in meta data tags associated with segments of the audio.

29. The storage medium of claim 28, wherein the meta data tags are MP3 ID3 tags.

* * * * *